US012706719B2

(12) United States Patent
Ibrahim et al.

(10) Patent No.: US 12,706,719 B2
(45) Date of Patent: Aug. 11, 2026

(54) SPATIAL SRS SOUNDING ADAPTATION IN LOS MIMO

(71) Applicant: QUALCOMM Incorporated, San Diego, CA (US)

(72) Inventors: Abdelrahman Mohamed Ahmed Mohamed Ibrahim, San Diego, CA (US); Naga Bhushan, San Diego, CA (US); Muhammad Sayed Khairy Abdelghaffar, San Jose, CA (US); Renqiu Wang, San Diego, CA (US); Pinar Sen, San Diego, CA (US); Seyong Park, San Diego, CA (US); Krishna Kiran Mukkavilli, San Diego, CA (US); Yu Zhang, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 277 days.

(21) Appl. No.: 18/685,474

(22) PCT Filed: Oct. 13, 2021

(86) PCT No.: PCT/CN2021/123431

§ 371 (c)(1),
(2) Date: Feb. 21, 2024

(87) PCT Pub. No.: WO2023/060463

PCT Pub. Date: Apr. 20, 2023

(65) Prior Publication Data

US 2025/0125928 A1 Apr. 17, 2025

(51) Int. Cl.
*H04L 5/00* (2006.01)
*H04W 24/10* (2009.01)
(Continued)

(52) U.S. Cl.
CPC ........... *H04L 5/0051* (2013.01); *H04W 24/10* (2013.01); *H04W 72/0453* (2013.01); *H04W 72/231* (2023.01)

(58) Field of Classification Search
None
See application file for complete search history.

(56) References Cited

U.S. PATENT DOCUMENTS

| | | | | |
|---|---|---|---|---|
| 11,310,816 | B2 | 4/2022 | Manolakos et al. | |
| 2015/0215793 | A1 * | 7/2015 | Siomina | H04W 64/00 455/456.1 |

(Continued)

FOREIGN PATENT DOCUMENTS

| | | | |
|---|---|---|---|
| CN | 112369087 | A | 2/2021 |
| CN | 113131979 | A | 7/2021 |

(Continued)

OTHER PUBLICATIONS

International Search Report and Written Opinion—PCT/CN2021/123431—ISA/EPO—Jul. 8, 2022.

(Continued)

*Primary Examiner* — Edemio Navas, Jr.
(74) *Attorney, Agent, or Firm* — ArentFox Schiff, LLP

(57) ABSTRACT

This disclosure provides systems, methods and apparatus, including computer programs encoded on computer storage media, for sounding reference signal (SRS) management for a line-of-sight multiple-input multiple-output (LSM) mode. A receiving device may receive a configuration of a persistent or semi-persistent SRS resource set that configures a first number of SRS ports for a full spatial sounding mode. The receiving device may transmit a SRS on a partial sounding resource subset of the SRS resource set, the partial sounding resource subset corresponding to a partial sounding LSM mode. A transmitting device such as a base station may performing phase ramp interpolation for the partial (Continued)

sounding LSM mode to estimate a LSM channel between the base station and the first receiving device.

30 Claims, 12 Drawing Sheets

(51) Int. Cl.
*H04W 72/0453* (2023.01)
*H04W 72/231* (2023.01)

(56) References Cited

U.S. PATENT DOCUMENTS

| | | | | |
|---|---|---|---|---|
| 2018/0152324 | A1* | 5/2018 | Park | H04B 7/10 |
| 2023/0047048 | A1* | 2/2023 | Liu | H04B 7/0417 |
| 2023/0111063 | A1* | 4/2023 | Ji | H04L 5/0012<br>370/329 |

FOREIGN PATENT DOCUMENTS

| | | | | |
|---|---|---|---|---|
| EP | 3029900 | B1 * | 8/2018 | H01Q 3/267 |
| WO | 2020013948 | | 1/2020 | |
| WO | 2021109404 | A1 | 6/2021 | |
| WO | 2021159452 | A1 | 8/2021 | |
| WO | 2021162445 | A1 | 8/2021 | |

OTHER PUBLICATIONS

Moderator (ZTE): "FL Summary #3 on SRS Enhancements", 3GPP TSG RAN WG1 Meeting #103-e, R1-2009723, e-Meeting, Oct. 26, 2020-Nov. 13, 2020, 7 Pages, Nov. 13, 2020 (Nov. 13, 2020) the whole document.

Supplementary European Search Report—EP21960205—Search Authority—The Hague—Apr. 24, 2025.

* cited by examiner

SPATIAL SRS SOUNDING ADAPTATION IN LOS MIMO

CROSS-REFERENCE TO RELATED APPLICATIONS

This is a national stage application filed under 37 U.S.C. 371 of International Patent Application No. PCT/CN2021/123431, filed Oct. 13, 2021, titled "SPATIAL SRS SOUNDING ADAPTATION IN LOS MIMO," the disclosure of which is incorporated herein by reference in its entirety.

TECHNICAL FIELD

The present disclosure relates to wireless communications including spatial sounding reference signal (SRS) sounding adaptation in line-of-sign multiple-input-multiple-output communications.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a receiving device such as a user equipment (UE) or relay node. The method may include receiving a configuration of a persistent or semi-persistent sounding reference signal (SRS) resource set that configures a first number of SRS ports for a full spatial sounding mode. The method may include transmitting a SRS on a partial sounding resource subset of the SRS resource set, the partial sounding subset corresponding to a partial sounding line of sight multiple-input-multiple-output (LSM) mode.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at an apparatus of a base station (BS). The method may include transmitting a configuration of a persistent or semi-persistent sounding reference signal (SRS) resource set that configures a first number of SRS ports for a full spatial sounding mode for a first receiving device. The method may include receiving a SRS on a partial sounding subset of the SRS resource set, the partial sounding subset corresponding to a partial sounding line of sight multiple-input-multiple-output (LSM) mode for the receiving device. The method may include performing phase ramp interpolation for the partial sounding LSM mode to estimate a LSM channel between the base station and the first receiving device.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
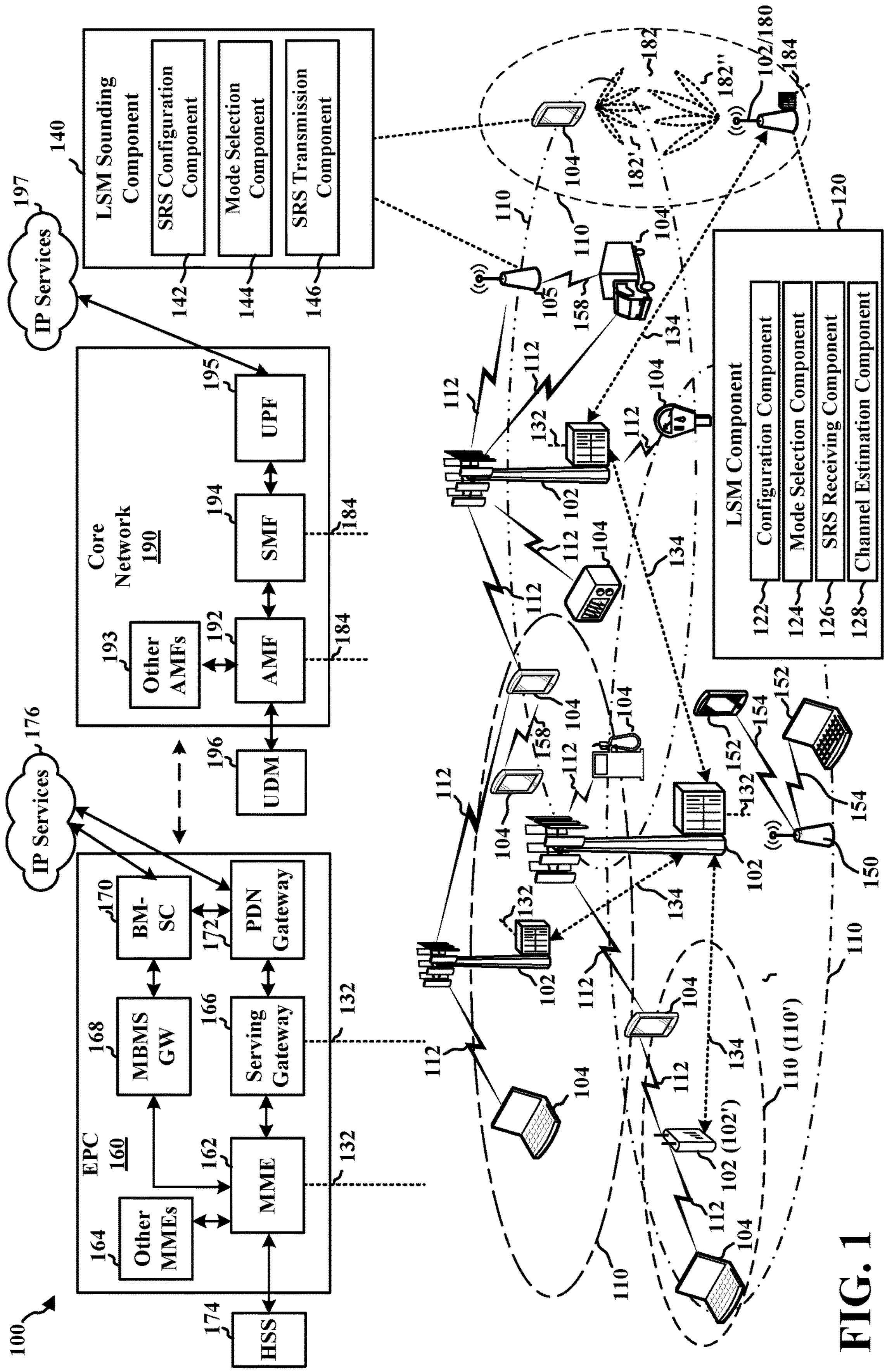
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

Multiple-input multiple-output (MIMO) refers to various antenna technologies utilizing multiple antennas, including spatial multiplexing, beamforming, and transmit diversity, Massive MIMO may refer to MIMO techniques utilizing a large array (e.g., at least 16) of antennas or antenna elements. Massive MIMO may be used for multiple users or for beamforming. Another MIMO technique, line-of-sight MIMO (LSM) may utilize a similar number of antennas or antenna elements for spatial multiplexing to achieve high multiplexing gains. LSM may offer potential benefits of the high multiplexing gains and simplified precoder selection. LSM gains, however, may be dependent upon distance and channel structure. LSM may be used in cases where a distance between transmit (Tx) and receive (Rx) antenna arrays does not exceed a certain threshold that depends on the respective apertures of the Tx and Rx arrays and carrier frequency. Additionally, an accurate LSM precoder may utilize channel knowledge at the transmitter, distance feedback, and misalignment compensation. Deployment scenarios where LSM may be an option include a backhaul link between a base station and a relay (e.g., an integrated access and backhaul (IAB) node, a smart repeater, or consumer premises equipment (CPE)) or an access link between a base station or relay and a user equipment (UE) such as a display or immobile IoT device. The term "receiving device" may refer to any device that receives a LSM transmission such as, but not limited to, a UE or a relay.

There may be a tradeoff between precoder selection and feedback overhead. An LSM transmitter (e.g., a base station) may attempt to select a best LSM precoder to improve signal quality at the receiver. For example, an optimal precoder may be selected based on singular value decomposition according to full channel knowledge. Such full channel knowledge, however, would require high signaling overhead. Accordingly, to reduce signaling overhead, the transmitter may select a sub-optimal precoder based on limited feedback. For example, partial sounding of receiver antennas may reduce resources utilized for transmitting sounding reference signals (SRS) from a receiver. In particular, partial sounding may be useful where there is a large number of receiver antennas (e.g., 8 or more), there is no misalignment estimation or compensation capability at the receiver, or there is mobility of the receiver. In some implementations, partial sounding may utilize the structure of the receiver antennas to estimate channel phase. For example, if the antennas are structured as a uniform linear array, a phase of each antenna may be estimated based on an interpolation of a phase ramp of two sounded antennas. A scaling factor may be used for non-uniform arrays. Accordingly, it may be possible to reduce the resources used for transmitting SRS when a transmitter is operating in a LSM mode.

In an aspect, the present disclosure provides techniques for signaling which resources a receiving device is to use in a partial sounding mode for LSM. The transmitter (e.g., a base station) may configure the receiver with a persistent or semi-persistent SRS resource set that configures a first number of SRS ports for a full spatial sounding mode. The base station or the receiver may determine that the receiving device is to use a partial sounding mode for LSM. The receiving device may transmit SRS on a partial sounding resource subset of the SRS resource set. The partial sounding resource subset may include fewer resources such as SRS ports, frequency resources (e.g., resource elements), and/or time resources (e.g., symbols) than the configured SRS resource set. The base station may reassign unused resources of the configured SRS resource set to another receiving device. Accordingly, the partial sounding LSM mode may improve resource utilization for a wireless communication system.

Particular implementations of the subject matter described in this disclosure can be implemented to realize one or more of the following potential advantages. The SRS resources for channel estimation may be conserved. For example, when a receiving device operates in a partial sounding LSM mode, unused SRS resources may be reassigned to other receiving devices (e.g., using an aperiodic SRS configuration). As another example, a receiving device may improve reliability of SRS transmissions by repeating SRS transmissions on the unused SRS resources. The benefits of LSM (e.g., high spectral efficiency) may be gained while reducing signaling overhead of SRS transmissions.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, relay devices 105, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUS may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the receiving devices such as UEs 104 or relay devices 105 may include a LSM sounding component 140 that adapts resources for SRS transmission according to a LSM sounding mode. The LSM sounding component 140) may include a SRS configuration component 142 configured to receive a configuration of a persistent or semi-persistent SRS resource set that configures a first number of SRS ports for a full spatial sounding mode. The LSM sounding component 140 may optionally include a mode selection component 144 configured to determine that partial sounding is to be used for LSM. The LSM sounding component 140 may include a SRS transmission component 146 configured to transmit a SRS on a partial sounding resource subset of the SRS resource set, the partial sounding subset corresponding to a partial sounding LSM mode.

In some implementations, one or more of the base stations 102 may include a LSM component 120 configured to perform LSM transmissions based on channel estimates of SRS resources adapted to an LSM sounding mode. The LSM component 120 may include a configuration component 122 configured to transmit a configuration of a persistent or semi-persistent SRS resource set that configures a first number of SRS ports for a full spatial sounding mode for a first receiving device. The LSM component 120 may optionally include a mode selection component 124 configured to determine that partial sounding is to be used for LSM for the first receiving device. The LSM component 120 may include a SRS receiving component 126 configured to receive a SRS on a partial sounding subset of the SRS resource set, the partial sounding subset corresponding to a partial sounding LSM mode. The LSM component 120 may include a channel estimation component 128 configured to perform phase ramp interpolation for the partial sounding LSM mode to estimate a LSM channel between the base station and the first receiving device.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as SI interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHZ unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a “Sub-6 GHZ” band in various documents and articles. A similar nomenclature issue sometimes occurs with regard to FR2, which is often referred to (interchangeably) as a “millimeter wave” (mmW) band in documents and articles, despite being different from the extremely high frequency (EHF) band (30 GHz-300 GHz) which is identified by the International Telecommunications Union (ITU) as a “millimeter wave” band.

With the above aspects in mind, unless specifically stated otherwise, it should be understood that the term “sub-6 GHZ” or the like if used herein may broadly represent frequencies that may be less than 6 GHZ, may be within FR1, or may include mid-band frequencies. Further, unless specifically stated otherwise, it should be understood that the term “millimeter wave” or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device, Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figures 2A, 2B, 2C, 2D:
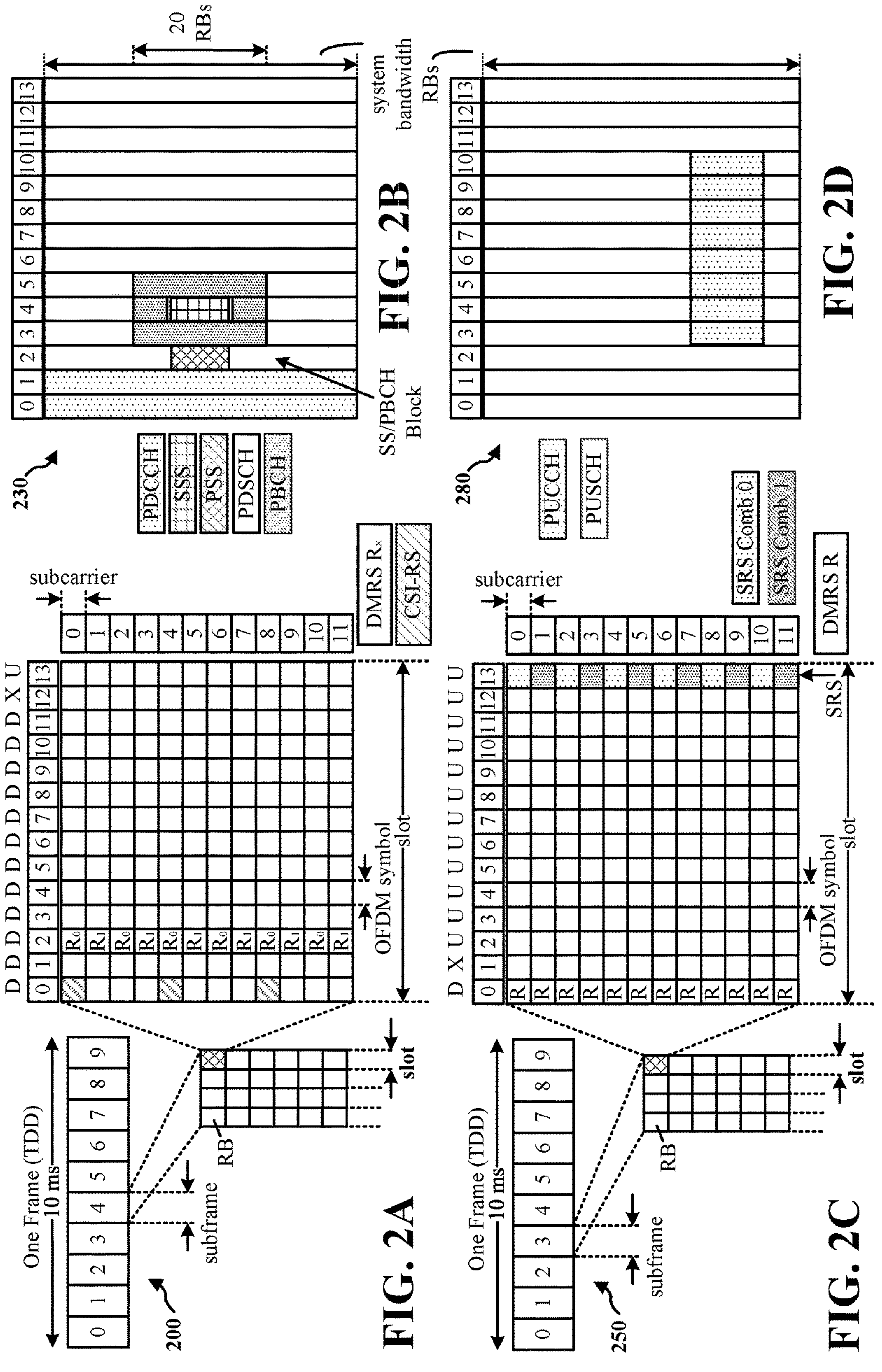
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a subframe.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10) milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios: limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 24 slots/subframe. The subcarrier spacing and symbol length/duration are a function of the numerology. The subcarrier spacing may be equal to $2^{\mu}*15$ kHz, where u is the numerology 0 to 5. As such, the numerology $\mu$=0) has a subcarrier spacing of 15 kHz and the numerology $\mu$=5 has a subcarrier spacing of 480 KHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used.

The UE may transmit sounding reference signals (SRS). An SRS resource set configuration may define resources for SRS transmission. For example, as illustrated, a SRS configuration may specify that SRS may be transmitted in the last symbol of a subframe. The SRS may have a comb structure, and a UE may transmit SRS on one comb for each SRS port. The SRS may be used by a base station for channel quality estimation to enable frequency-dependent scheduling on the UL. The SRS may also be used for channel estimation to select a precoder for downlink MIMO.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
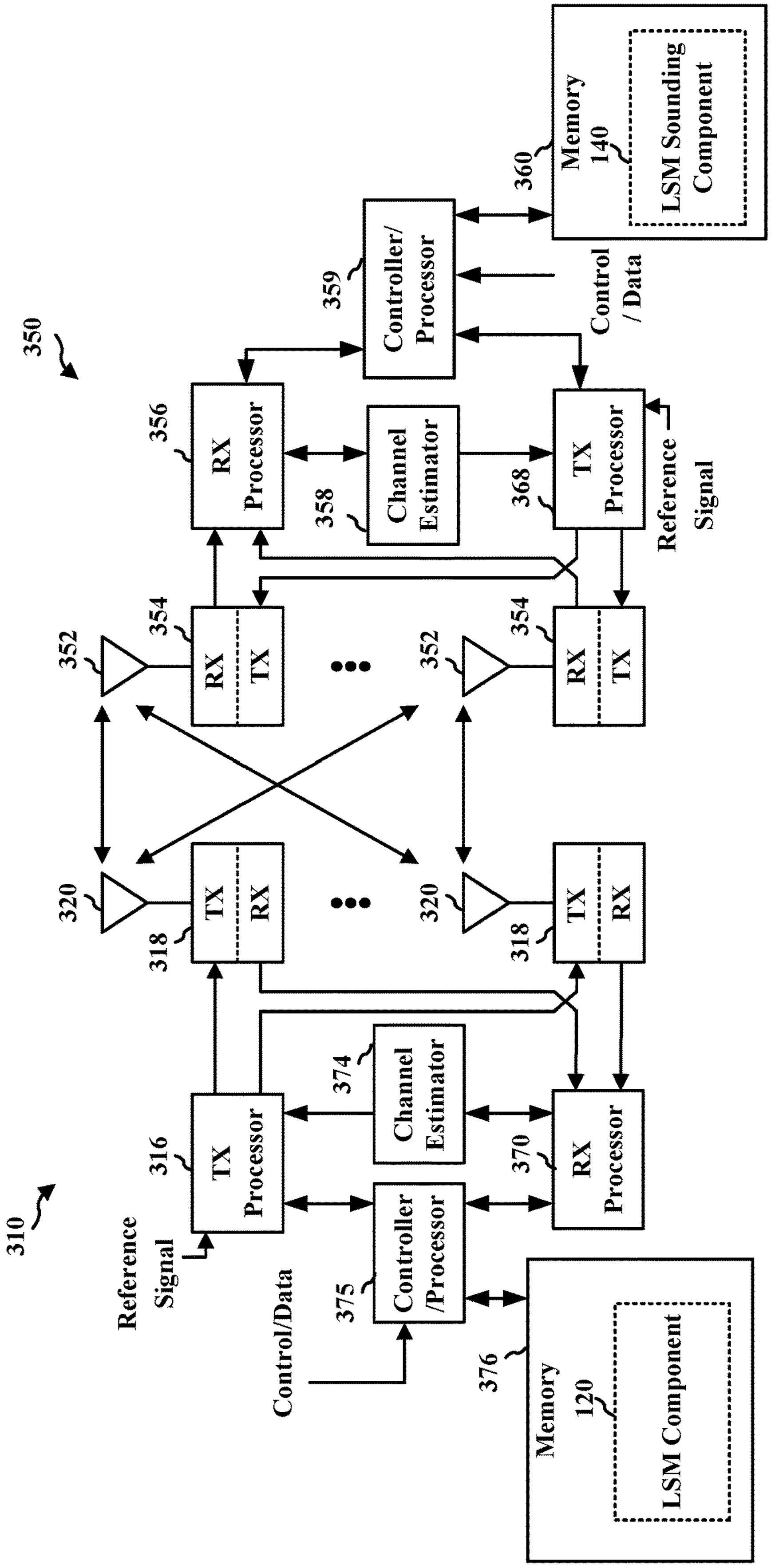
FIG. 3 is a diagram illustrating an example of a base station (BS) and user equipment (UE) in an access network.

FIG. 3 is a diagram of an example of a base station 310 and a UE 350 in an access network. The UE 350 may be an example of a receiving device. In the DL. IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB. SIBs). RRC connection control (such as RRC connection paging. RRC connection establishment. RRC connection modification, and RRC connection release), inter radio access technology (RAT) mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK). M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the LSM sounding component 140 of FIG. 1. For example, the memory 360 may include executable instructions defining the LSM sounding component 140. The TX processor 368, the RX processor 356, and/or the controller/processor 359 may be configured to execute the LSM sounding component 140.

At least one of the TX processor 316, the RX processor 370, and the controller/processor 375 may be configured to perform aspects in connection with the LSM component 120 of FIG. 1. For example, the memory 376 may include executable instructions defining the LSM component 120. The TX processor 316, the RX processor 370, and/or the controller/processor 375 may be configured to execute the LSM component 120.

Figure 4:
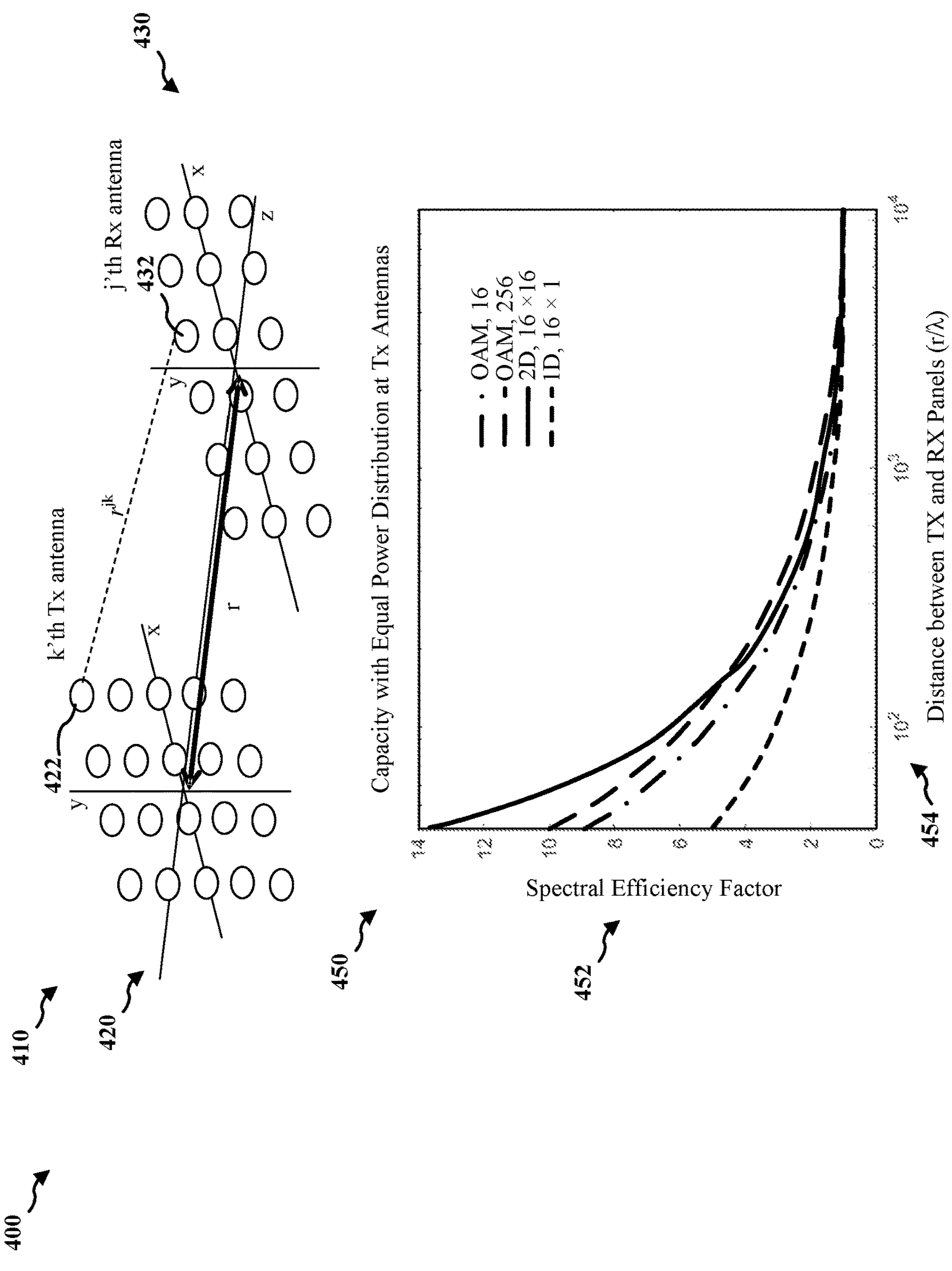
FIG. 4 is a diagram illustrating an example of a line-of-sight (LOS) multiple-input multiple-output (MIMO) system and performance thereof.

FIG. 4 is a diagram 400 illustrating an example of a LSM system 410 and performance chart 450. The LSM system 410 may include a transmit antenna array 420 including antennas 422 (which may include antenna elements) and a receive antenna array 430 including antennas 432 (which may include antenna elements). A distance (r) may refer to a distance between the respective centers of the transmit antenna array 420 and the receive antenna array 430. The distance between individual antennas or antenna elements in the arrays may vary depending on array structure and alignment. The distance between a $k^{th}$ transmit antenna and a $j^{th}$ receive antenna may be $r_{j,k}$.

LSM may be modeled as a Rician channel model where a channel (H) has a LOS component ($H_{LOS}$) and a non-LOS component ($H_{NLOS}$). The channel may be expressed as $H=a\cdot H_{LOS}+b\cdot H_{NLOS}$, where a and b are weighting factors and $a^2+b^2=1$. The term $a^2$ may be referred to as a LOS percentage. The $H_{LOS}$ may be expressed as:

$$H_{LOS} = \frac{e^{-i2\pi\frac{r_{j,k}}{\lambda}}}{\frac{r_{j,k}}{\lambda}},$$

where $H_{NLOS} \in$ {i.i.d. Rayleigh, CDL-x,TDL-x}. That is, the non-LOS component may experience independent and identically distributed Rayleigh fading with respect to a clustered delay line (CDL) and tapped delay line (TDL) or generated from a CDL model or TDL model. The structure of a LSM channel can be exploited to achieve a high multiplexing gain as indicated by the following expression:

$$h_{mn} \,\alpha\, \frac{\exp\left(-i2\pi\frac{r_{mn}}{\lambda}\right)}{r_{mn}},$$

where m is the number of receive antennas and n is the number of transmit antennas.

The performance chart 450 illustrates a spectral efficiency factor 452 for an LSM system with various antenna array configurations with respect to distance 454 between antenna arrays. The distance 454 may be expressed in units of wavelength (λ). The spectral efficiency factor is the ratio between achievable spectral efficiency and single mode capacity log 2(1+$N_r$*SNR) and the spectral efficiency factor is an indication of spatial multiplexing gain. The example assumes equal power distribution at the transmit antenna array 420. The LSM gain decreases as the distance increases. In this example, all multiplexing gain vanishes at 10000%, e.g., for 3.5 GHZ, 1000 2=85m. The maximum distance where a system achieves LSM gain depends on the product of the Tx and Rx antenna apertures.

Figure 5:
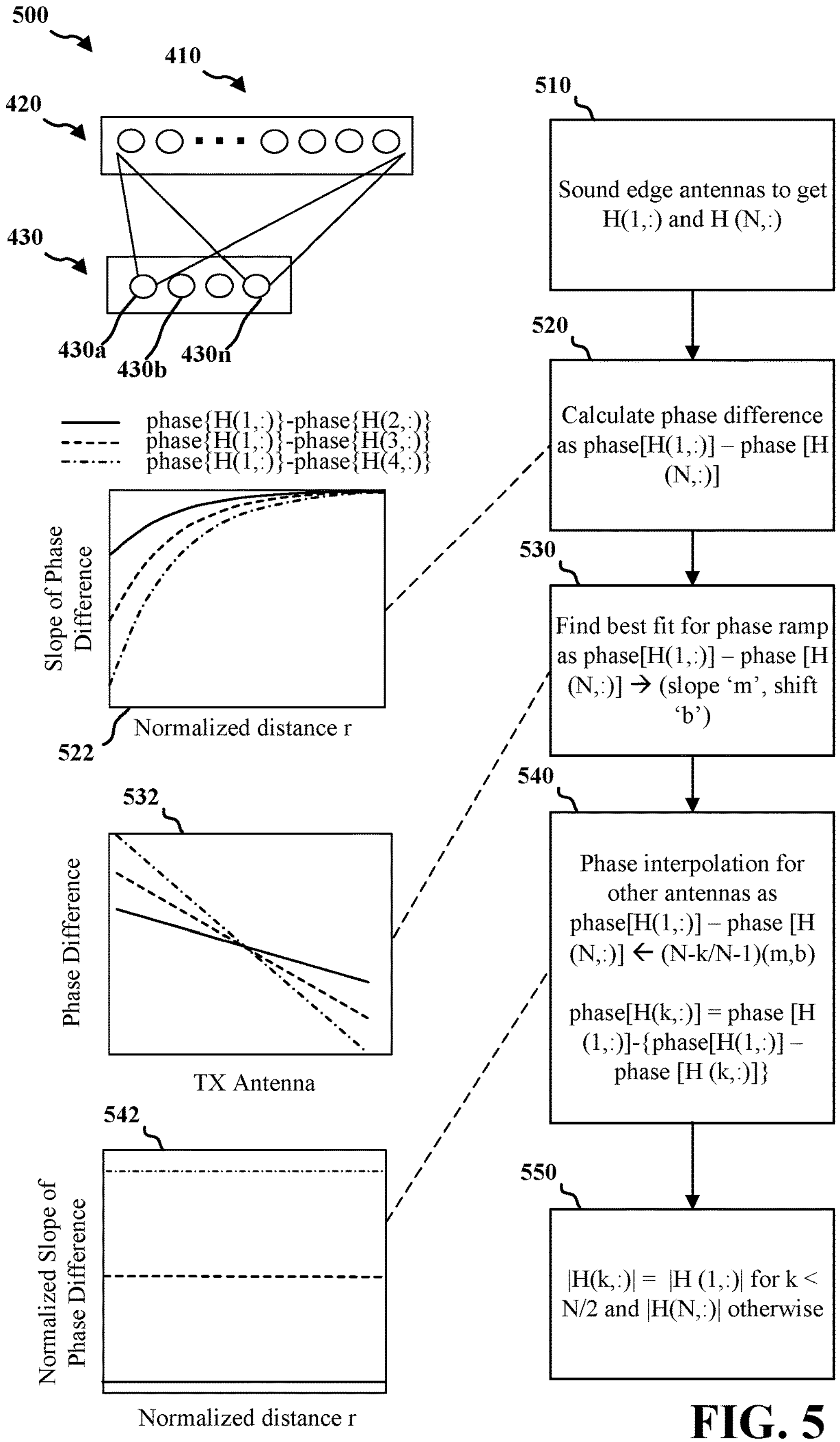
FIG. 5 is a diagram illustrating an example phase interpolation technique for channel estimation.

FIG. 5 is a diagram 500 illustrating an example phase interpolation technique for channel estimation. The phase interpolation technique may be applicable in the LSM system 410 including a transmit antenna array 420 and a receive antenna array 430. For a large enough distance (e.g., r is much greater than the Rx aperture), the phase difference between two sounding antennas is a phase ramp over the Tx antennas. The slope of the phase ramp changes with distance and misalignment, however, the ratio between the phase ramps is fixed. The ratio depends on the structure of the antenna arrays. For simplicity, a uniform linear array (ULA) is discussed, but the technique can be extended to other antenna arrays. Partial sounding for channel estimation may utilize the phase interpolation technique based on static information about antenna structures.

At block 510, the receiving device may sound edge antennas. For example, the receiving device may transmit SRS from an antenna 430*a* and antenna 430*n*, which may be edge antennas of a linear array or corner antennas of a two-dimensional array. In some implementations, where the receive antenna array 430 are aligned with the transmit antenna array 420, the receiving device may transmit SRS from a single antenna. The transmitting device may receive the SRS at each antenna of the transmit antenna array 420. Accordingly, the transmitting device may determine the channels between the sounded receive antennas and each of the transmit antennas. For example, H(1,:) may represent the channels for antenna 430*a* and H(N,:) may represent the channels for antenna 430*n*.

At block 520, the transmitting device may calculate a phase difference between each of the sounded receive antennas. The phase difference may be expressed as phase [H(1,:)]-phase [H(N,:)]. Chart 522 illustrates how a slope of the phase difference changes based on the distance.

At block 530, the transmitting device may find a best fit for a phase ramp of each sounded receive antenna. The distance between the sounded receive antenna 432 and each transmit antenna 422 will change slightly based on the antenna array structure. Accordingly, as illustrated in chart 532, there is a linear phase ramp of the phase difference at each transmit antenna 420. The best fit line for the measured phase differences gives a slope (m) and shift (b) of the phase ramp.

At block 540, the transmitting device may use phase interpolation to determine a phase of non-sounded receive antennas (e.g., antenna 430*b*). For example, for a ULA, a scaling factor for the $k^{th}$ receive antenna may be expressed as (N−k/N−1). The scaling factor may be applied to (m,b). The phase of the $k^{th}$ antenna (phase [H(k,:)]) including non-sounded receive antennas may be expressed as phase [H(k,:)]=phase [H(1,:)]-{phase [H(1,:)]-phase [H(k,:)]}. The slope of the phase ramp changes with distance and misalignment, however, the ratio between them is fixed. Therefore, the normalized slope of the phase difference may be a constant with respect to the normalized distance as illustrated in chart 542.

At block 550, the transmitting device may determine the amplitude, which may be assumed to be the same as the closest sounded receive antenna receive antennas. That is for receive antennas with k<N/2, the amplitude may be the amplitude of the first antenna, and for receive antennas with k>N/2, the amplitude may be the amplitude of the last antenna.

Figure 6:
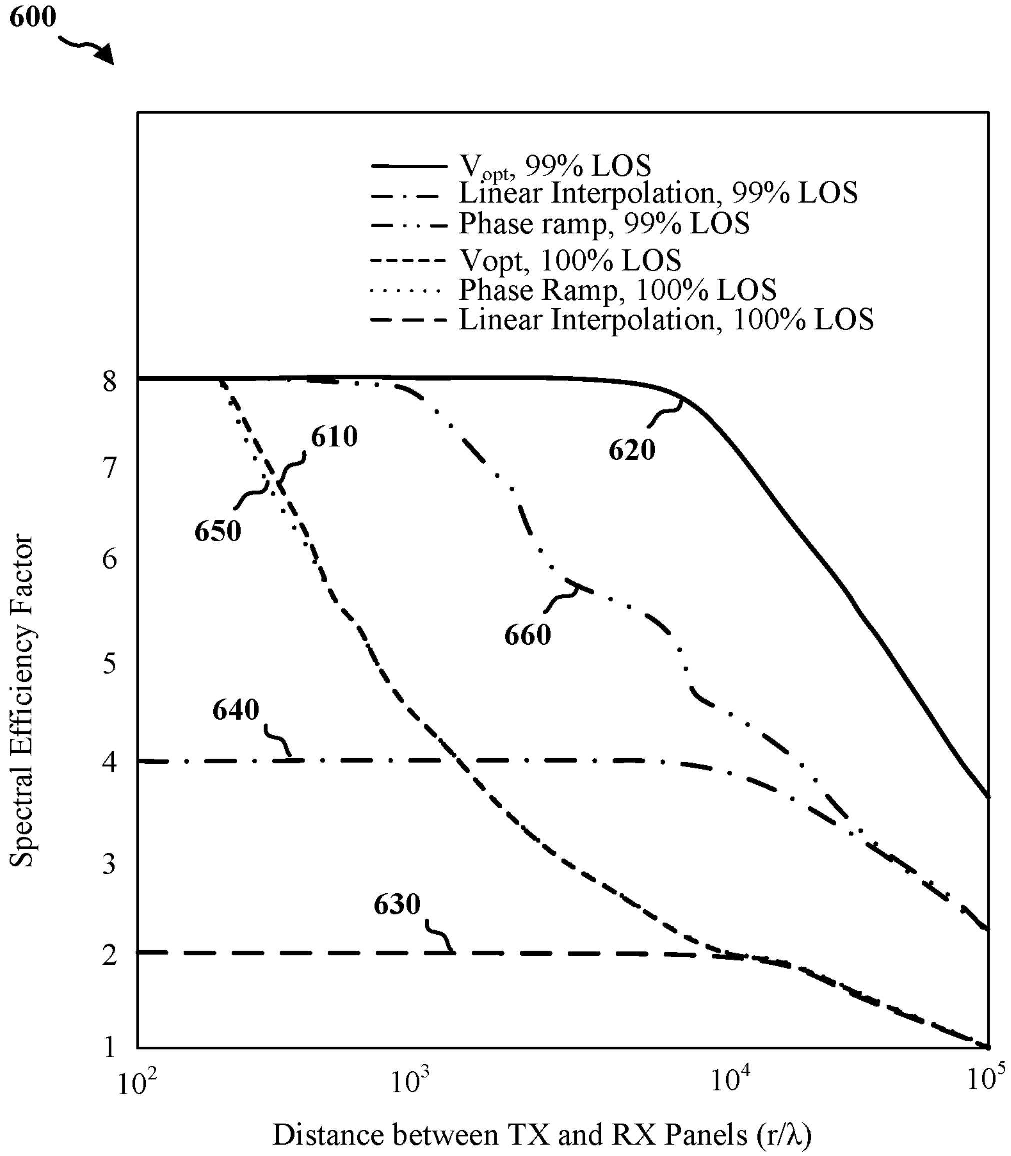
FIG. 6 is a diagram illustrating performance of the example phase interpolation technique in comparison to other channel estimation techniques.

FIG. 6 is a diagram 600 illustrating simulated performance of the example phase interpolation technique in comparison to other channel estimation techniques. The simulation is based on a 1×32 ULA of transmit antennas and 1×8 ULA of receive antennas with h=2, $SNR_{1\lambda}$=130 dB, water filling power distribution, an xy shift=5 and y-rotation=π/4. The performance may be represented as a spectral efficiency factor. As discussed above, the spectral efficiency factor for LSM decreases as the distance between the transmit antennas and receive antennas increases.

Precoding matrices selected based on a full sounding technique (e.g., with SVD) may produce curves 610 for a 100% LOS channel and curve 620 for a 99% LOS channel. As illustrated, the maximum spectral efficiency factor may be 8 based on the number of receive antennas. One technique for channel estimation based on partial sounding is a linear interpolation of the channels. As illustrated by curve 630 for a 100% LOS channel and curve 640 for a 99% LOS channel, the spectral efficiency for the precoding matrix selected based on linear interpolation has significant limits (capped at a factors of 2 and 4 respectively) in comparison to full sounding represented by curves 610 and 620.

The phase interpolation technique discussed above with respect to FIG. 5 shows significant improvement over the linear interpolation technique. The curve 650 closely tracks the curve 610 for the 100% LOS channel. The curve 660 for the 99% LOS channel shows improvement over the curve 640 beyond 10,000λ. Accordingly, the phase interpolation technique may provide the gains of LSM while also reducing signaling overhead of SRS.

Figure 7:
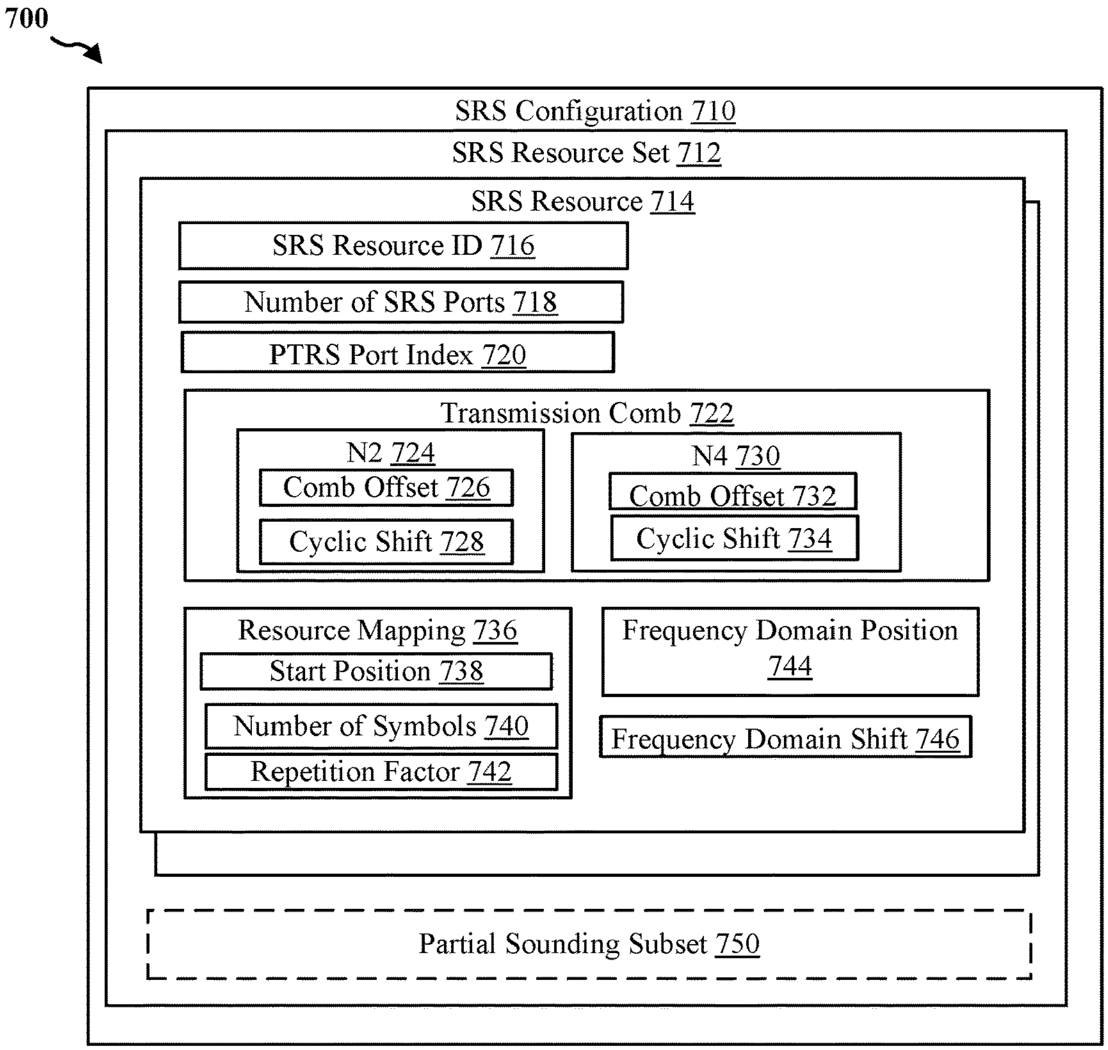
FIG. 7 is a diagram illustrating SRS resource configuration.

FIG. 7 is a diagram 700 illustrating SRS resource configuration. In an aspect, the present disclosure provides techniques for adapting configured SRS resources for partial sounding. In general, the receiving device may reduce SRS resource usage when in a partial sounding LSM mode. The reduction may be in number of SRS ports, time, and/or frequency. In some implementations, the transmitting device may reassign unused SRS resources to other receiving devices. In some implementations, the receiving device may repeat the SRS for the sounded antennas on resources configured for the unsounded antennas.

FIG. 7 is a diagram 700 illustrating an example of a SRS configuration 710. A base station may configure a receiving device with a SRS configuration 710 via radio resource control (RRC) signaling. For example, the receiving device may transmit a capability message indicating, for example, a number of antennas and a maximum number of SRS ports. The base station may transmit a configuration message for the SRS configuration 710. For example, the configuration message may establish the SRS configuration 710 or change a configured SRS resource set 712.

The SRS configuration 710 may include one or more SRS resource sets 712. The SRS resource set 712 may include one or more SRS resources 714. Each SRS resource may be associated with a SRS resource ID 716, a number of SRS ports 718, a phase tracking reference signal (PTRS) port index 720, a transmission comb 722, a resource mapping 736, a frequency domain position 744, and a frequency domain shift 746. The transmission comb 722 may define the SRS combs illustrated in FIG. 2C. For example, the transmission comb 722 may define a 2-port comb 724 having a comb offset 726 and cyclic shift 728 or a 4-port comb 730 having a comb offset 732 and cyclic shift 734. The resource mapping 736 may define time domain resources according to a start portion 738, a number of symbols 740, and a repetition factor 742. The frequency domain position 744 and frequency domain shift 746 may define the time domain resources for the SRS.

Figure 8:
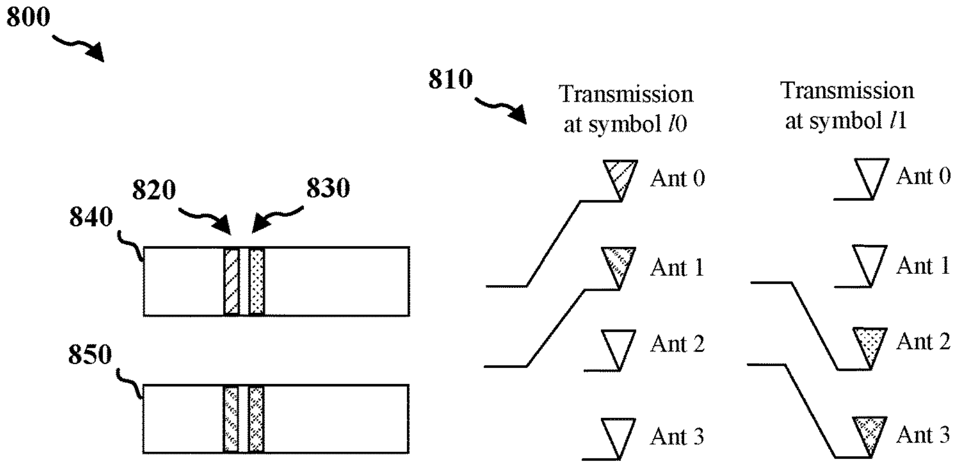
FIG. 8 is a diagram illustrating application of a SRS resource configuration to multiple antennas.

FIG. 8 is a diagram 800 illustrating an example application of a SRS configuration to receive antennas 810 of a receiving device. In general, a SRS port corresponds to a receive antenna 432. Depending on the capabilities of the receiving device, the receiving device may not be able to sound all antennas in the same. For example, as illustrated, a receiving device may include four antennas 810 (e.g., Ant 0-Ant 3). The SRS configuration 710 may define a first SRS resource 820 and a second SRS resource 830, each having two SRS ports associated with a respective SRS comb as shown in FIG. 2C. Accordingly, the total number of SRS ports may be equal to the number of antennas 810. In the first SRS resource 820, the receiving device may sound Ant 0 on frequency domain resources 840) corresponding to a first SRS comb and sound Ant 1 on frequency domain resources 850) corresponding to a second SRS comb. Similarly, on the second SRS resource 820, the receiving device may sound Ant 2 on frequency domain resources 840) corresponding to a first SRS comb and sound Ant 3 on frequency domain resources 850) corresponding to a second SRS comb.

Referring again to FIG. 7, in an aspect, the SRS configuration 710 may be extended to define a partial sounding subset 750. The partial sounding subset 750 may be a subset of the SRS resource set 712. That is, the partial sounding subset 750 may include fewer resources than the SRS resource set 712. For example, the resources of the partial sounding subset 750) may be reduced in the number of SRS resources 714, the number of SRS ports 718 for one or more SRS resources, the time domain of one or more SRS resources, the frequency domain of one or more SRS resources, or transmission power. For example, the partial sounding subset 750 may indicate SRS ports to be skipped or deactivated in the partial sounding LSM mode. The partial sounding subset 750) may correspond to SRS ports for corner antennas of an antenna array (e.g., receiving antennas 432) of the receiving device. The partial sounding subset 750 may indicate that SRS ports that are in the SRS resource set 712 but not in the partial sounding subset 750 are to be set to zero transmission power. In some implementations, the partial sounding subset 750) specifies a reduced periodicity for SRS ports for the SRS ports that are in the SRS resource set but not in the partial sounding subset. In some implementations, the partial sounding subset specifies reduced frequency domain resources or frequency domain hops for the SRS ports that are in the SRS resource set but not in the partial sounding subset.

Figure 9:
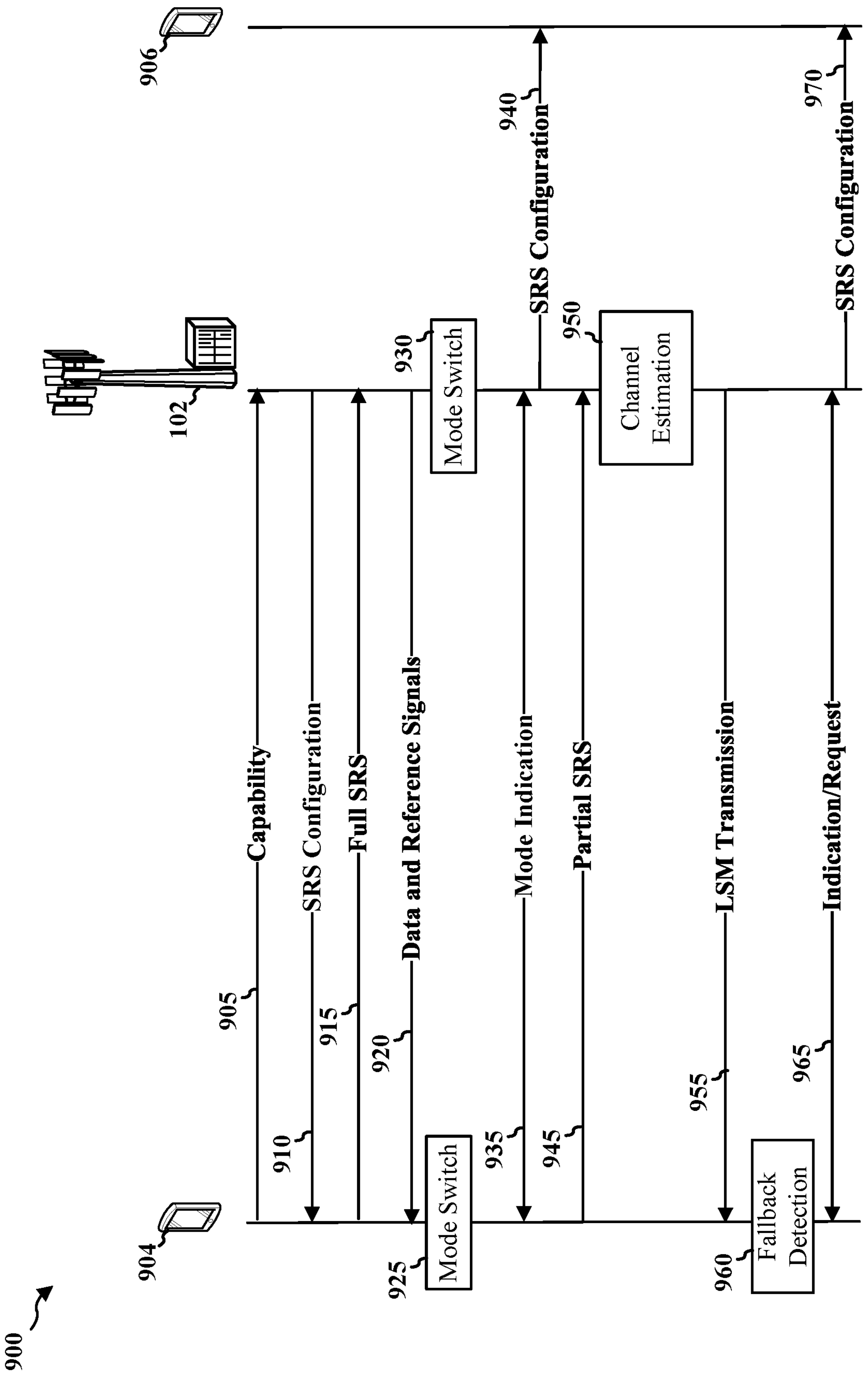
FIG. 9 is a message diagram illustrating example messages for managing SRS resources for channel estimation in a LOS MIMO (LSM) system.

FIG. 9 is a message diagram 900 illustrating example messages between a base station 102 and a receiving device 904 for adapting SRS resources for partial sounding. The receiving device 904 may transmit capability message 905 to the base station 102. The capability message 905 may indicate, for example, a number of antennas and a maximum number of SRS ports. In some implementations, the capability message 905 may include a supported SRS transmit port switch capability that defines one or more combinations of SRS ports and transmissions per symbol. For example, a capability of 1T4R indicates an ability to sound 4 SRS ports one at a time and a capability of 2T4R indicates support for sounding 4 SRS ports over 2 symbols.

The base station 102 may transmit a SRS configuration message 910, which may be, for example, an RRC configuration or RRC reconfiguration message. The SRS configuration message 910 may include or configure the SRS configuration 710.

The receiving device 904 may transmit a full SRS 915. That is, the receiving device 904 may sound all configured SRS ports according to the SRS configuration 710. The base station 102 may transmit data and reference signals 920. The data and reference signals 920 may be, for example, a LSM transmission using a channel estimate based on the full SRS 915.

The receiving device 904 may determine a mode switch 925 and/or the base station 102 may determine a mode switch 930. For example, the receiving device 904 may autonomously activate the partial sounding LSM mode in response to a measurement at the receiving device 904. For instance, the measurement at the receiving device 904 may be an estimated line of sight percentage or estimated spectral efficiency factor for the partial sounding LSM mode. The base station 102 may determine the mode switch 930 based on measurements of the SRS and/or reported channel quality information (CQI). In either case, the receiving device 904 or the base station 102 that determines the mode switch 925 or 930 may transmit a mode indication 935 to the other device. For example, the base station 102 may transmit the mode indication 935 as a downlink control information (DCI) or media access control (MAC) control element (CE) that indicates an adaptation of a number of transmit antennas or receive antennas. In another implementation, the base station 102 may transmit the mode indication 935 as a DCI or MAC-CE that indicates a change to the partial sounding LSM mode. The receiving device 904 may transmit the mode indication 935 as uplink control information or an uplink MAC-CE.

In an aspect, after the mode switch indication 935, the base station 102 may transmit a SRS configuration 940 to a second receiving device 906 to assign SRS resources that are in the SRS resource set but not in the partial sounding subset to a second receiving device 906 while the first receiving device 904 is in the partial sounding LSM mode. That is, the base station 102 may configure the second receiving device 906 to reuse the resources saved via the partial sounding mode.

The receiving device 904 may transmit a partial SRS 945 based on the partial sounding subset 750. For example, the partial sounding subset 750 may correspond to SRS ports for corner antennas of an antenna array of the receiving device 904, and the receiving device 904 may transmit on only the corner antennas. Or the receiving device 904 may set SRS ports that are in the SRS resource set 712 but not in the partial sounding subset 750 to zero power. In some implementations, the receiving device 904 may repeat a transmission on a SRS port for the partial sounding subset on the resources of the SRS ports that are in the SRS resource set 712 but not in the partial sounding subset. For instance, the receiving device 904 may repeat the subset of ports on the resources (time (symbols), frequency (comb), or cyclic shift) which were dedicated to the SRS ports that are not being sounded. In some implementations, the partial sounding subset 750 specifies a reduced periodicity for the SRS ports that are in the SRS resource set but not in the partial sounding subset. For instance, the receiving device 904 may alternate between transmitting the full SRS 915 and the partial SRS 945 while in the partial sounding mode. In some implementations, the partial sounding subset specifies reduced frequency domain resources or frequency domain hops for the SRS ports that are in the SRS resource set but not in the partial sounding subset. For instance, some SRS ports may only be transmitted over a portion of the active bandwidth part or may not follow a frequency hopping pattern.

At block 950, the base station 102 may perform channel estimation on the partial SRS 945. For example, the base station 102 may perform phase ramp interpolation for the partial sounding LSM mode to estimate a LSM channel between the base station and the first receiving device 904. For instance, the base station 102 may perform the phase ramp interpolation as describe above with respect to FIG. 5.

The base station 102 may transmit a LSM transmission 955 based on the channel estimate from block 950. For example, the base station 102 may select a precoding matrix based on the channel estimation.

At block 960, the receiving device 904 may detect a condition for fallback to a full spatial sounding mode. In some implementations, the condition may be based on a quality metric such as a channel quality indicator (CQI) or a time. For instance, if a CQI determined by the receiving device 904 is less than a threshold, the receiving device 904 may detect the fallback condition. In some implementations, the condition may be based on a timer or duration of the LSM mode.

The receiving device 904 may transmit an indication or request 965 for fallback in response to detecting the fallback condition in block 960. In some implementations, the indication may be, for example, an uplink MAC-CE indicating that the partial LSM mode is deactivated. In some implementations, the receiving device 904 may implicitly indicate detection of the fallback condition, for example, by reporting a CQI value that is less than a configured threshold. In some implementations, the indication or request 965 may be a request for the base station 102 to change the mode to the full spatial sounding mode (e.g., by sending a mode indication 935). The base station 102 may transmit another SRS configuration 970 to the second receiving device 906 in response to the indication or request 965. Accordingly, the first receiving device 904 may resume use of the full configured SRS resource set 712.

Figure 10:
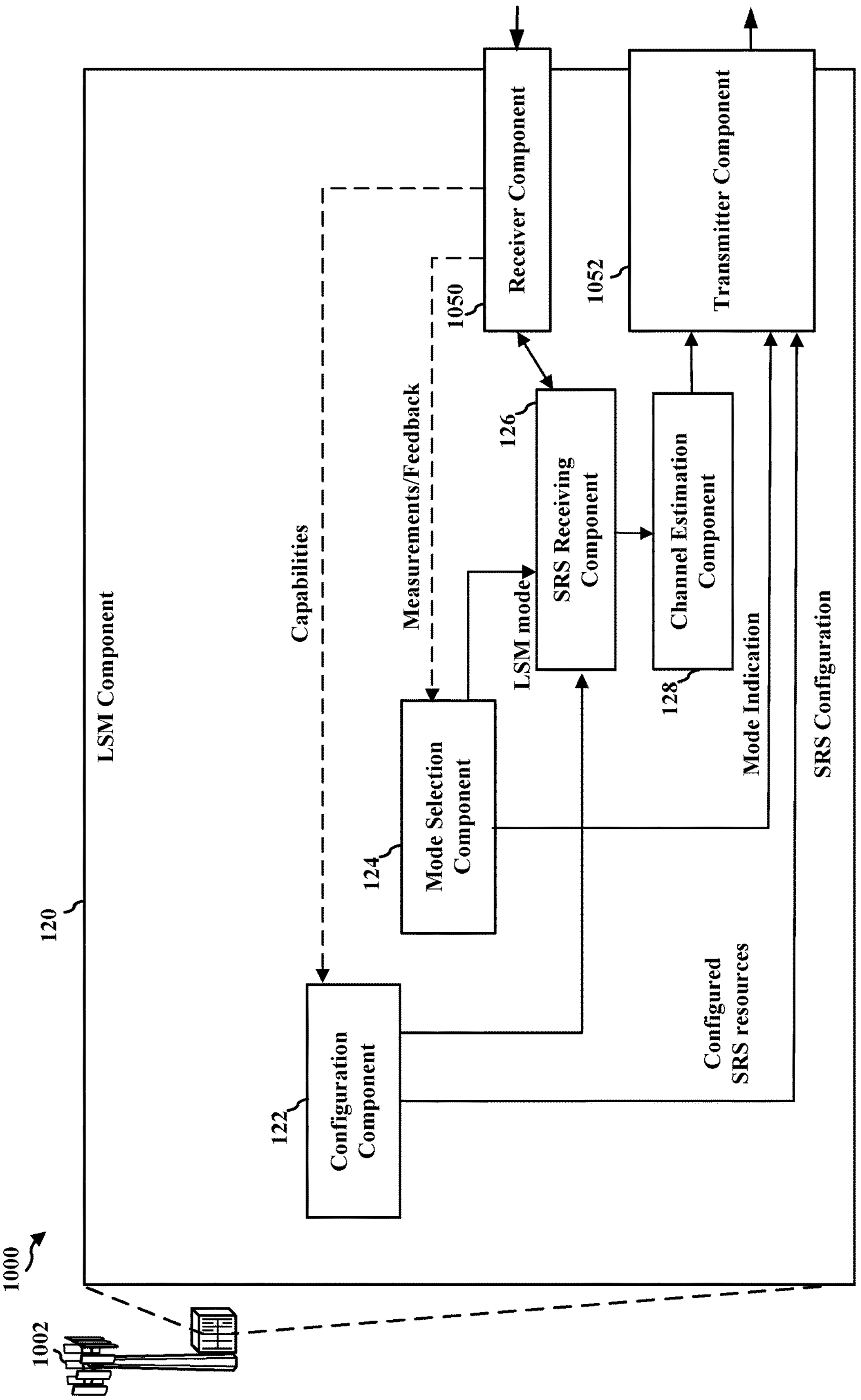
FIG. 10 is a conceptual data flow diagram illustrating the data flow between different means/components in an example BS.

FIG. 10 is a conceptual data flow diagram 1000 illustrating the data flow between different means/components in an example base station 1002, which may be an example of the base station 102 including the LSM component 120. The LSM component 120 may be implemented by the memory 376 and the TX processor 316, the RX processor 370, and/or the controller/processor 375 of FIG. 3. For example, the memory 376 may store executable instructions defining the LSM component 120 and the TX processor 316, the RX processor 370, and/or the controller/processor 375 may execute the instructions.

The base station 1002 may include a receiver component 1050, which may include, for example, a radio frequency (RF) receiver for receiving the signals described herein. The base station 1002 may include a transmitter component 1052, which may include, for example, an RF transmitter for transmitting the signals described herein. In an aspect, the receiver component 1050 and the transmitter component 1052 may co-located in a transceiver such as illustrated by the TX/RX 318 in FIG. 3.

As discussed with respect to FIG. 1, the LSM component 120 may include the configuration component 122, the mode selection component 124, the SRS receiving component 126, and the channel estimation component 128.

The receiver component 1050 may receive UL signals from the receiving device 904 including SRS and UL communications. In some implementations, the receiver component 1050 may optionally receive a capability message 905 indicating capabilities of the receiving device 904 for SRS sounding and antenna switching. The receiver component 1050 may provide the capabilities to the configuration component 122. In some implementations, the receiver component 1050 may receive feedback from a receiving device 904. For example, the feedback may include measurements, a mode indication, or a mode request. The receiver component 1050 may provide the feedback to the mode selection component 124. The receiver component 1050 may receive SRS (e.g., full SRS 915 or partial SRS 945) on configured SRS resources. The receiver component 1050 may provide the received SRS to the SRS receiving component 126.

The configuration component 122 may be configured to transmit a configuration of a persistent or semi-persistent SRS resource set that configures a first number of SRS ports for a full spatial sounding mode for a first receiving device 904. For example, the configuration component 122 may determine a SRS configuration 710 for the receiving device based on the capability message 905 received from the receiving device 904. In some implementations, the configuration component 122 may configure the SRS resource set to include the first number of SRS ports equal to a number of receive antennas of the receiving device 904. The configuration component 122 may configure a number of SRS resources 714 to sound the first number of SRS ports based on the capabilities of the receiving device 904. The configuration component 122 may transmit one or more configuration messages to the receiving device 904 via the transmitter component 1052. For example, the configuration messages may be RRC configuration messages. In particular, the configuration component 122 may transmit the SRS configuration message 910 via the transmitter component 1052.

The mode selection component 124 may be configured to determine that partial sounding is to be used for LSM for the receiving device 904. For example, the mode selection component 124 may select between a full sounding mode and a partial sounding LSM mode. The mode selection component 124 may transmit a mode indication 935 to the receiving device 904. For example, the mode selection component 124 may transmit a DCI or a MAC-CE that indicates an adaptation of a number of transmit antennas or receive antennas to the first UE. For instance, the DCI or MAC-CE may indicate only 2 antennas for the partial sounding mode. In another example, the mode selection component 124 may transmit a DCI or MAC-CE that indicates a change to the partial sounding LSM mode to the first receiving device 904. In some implementations, the receiving device 904 may autonomously select the partial sounding LSM mode, and the mode selection component 124 may receive an indication of the partial sounding LSM mode from the first UE. Conversely, the receiving device 904 may autonomously fall back to the full sounding LSM mode, and the mode selection component 124 may receive an indication that the first receiving device 904 has changed to the full spatial sounding mode or a performance metric measured by the first receiving device 904 that indicates a change to the full spatial sounding mode. The mode selection component 124 may provide the LSM mode to the SRS receiving component 126.

The SRS receiving component 126 may be configured to receive a SRS on a partial sounding subset of the SRS resource set. The partial sounding subset may correspond to a partial sounding LSM mode. For example, the SRS receiving component 126 may configure the receiver component 1050 with the SRS resources for the partial sounding LSM mode. The SRS receiving component 126 may receive the signals received on the SRS resources from the receiver component 1050. The SRS receiving component 126 may provide the received SRS to the channel estimation component 128.

The channel estimation component 128 may be configured to perform phase ramp interpolation for the partial sounding LSM mode to estimate a LSM channel between the base station and the first receiving device 904. The channel estimation component 128 may select a precoding matrix for LSM transmissions based on the channel estimate. The channel estimation component 128 may provide the precoding matrix to the transmitter component 1052.

Figure 11:
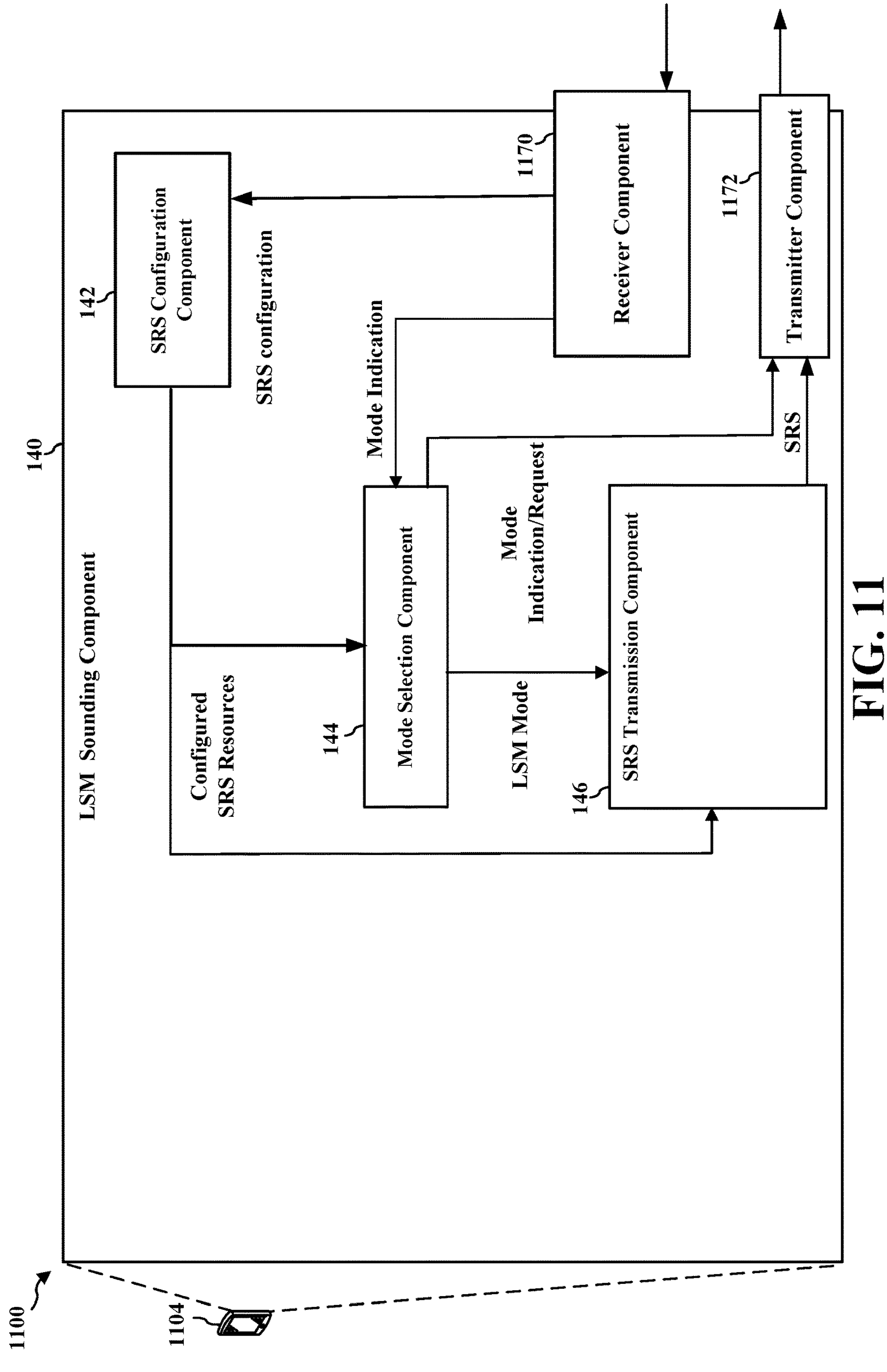
FIG. 11 is a conceptual data flow diagram illustrating the data flow between different means/components in an example receiving device.

FIG. 11 is a conceptual data flow diagram 1100 illustrating the data flow between different means/components in an example receiving device 1104, which may be an example of the receiving device 904, the UE 104, or the relay device 105 and include the LSM sounding component 140. The LSM sounding component 140 may be implemented by the memory 360 and the TX processor 368, the RX processor 356, and/or the controller/processor 359. For example, the memory 360 may store executable instructions defining the LSM sounding component 140 and the TX processor 368, the RX processor 356, and/or the controller/processor 359 may execute the instructions.

The receiving device 1104 may include a receiver component 1170, which may include, for example, a RF receiver for receiving the signals described herein. The receiving device 1104 may include a transmitter component 1172, which may include, for example, an RF transmitter for transmitting the signals described herein. In an aspect, the receiver component 170 and the transmitter component 1172 may co-located in a transceiver such as the TX/RX 352 in FIG. 3.

As discussed with respect to FIG. 1, the LSM sounding component 140 may include the SRS configuration component 142, the mode selection component 144, and the SRS transmission component 146.

The receiver component 1170 may receive DL signals described herein such as the SRS configuration message 910, mode indication 935, and downlink communications. The receiver component 1170 may provide the SRS configuration message 910 to the SRS configuration component 142. The receiver component 1170 may provide the mode indication 935 to the mode selection component 144.

The SRS configuration component 142 may be configured to receive a configuration of a persistent or semi-persistent SRS resource set that configures a first number of SRS ports for a full spatial sounding mode from the receiver component 1170. In particular, the SRS configuration component 142 may receive the SRS configuration message 910, which may include the SRS configuration 710 or SRS resource set 712. The SRS configuration component 142 may provide the SRS configuration to the mode selection component 144.

The mode selection component 144 may be configured to determine that partial sounding is to be used for LSM. For example, the mode selection component 144 may select between the partial sounding LSM mode and the full sounding LSM mode. In some implementations, the base station 102 may select the LSM mode, and the mode selection component 144 may receive a mode indication 935 via the receiver component 1170. For example, the mode selection component 144 may receive a DCI or a MAC-CE that indicates an adaptation of a number of transmit antennas or receive antennas. As another example, the mode selection component 144 may a DCI or a MAC-CE that indicates a change to the partial sounding LSM mode. In some implementations, the mode selection component 144 may autonomously select the LSM mode based on measurements at the receiving device 1104. The mode selection component 144 may transmit a mode indication 935 or request 965 to the base station 102 via the transmitter component 1172. The mode selection component 144 may provide the selected LSM mode to the SRS transmission component 146.

The SRS transmission component 146 may receive the configured SRS resources from the SRS configuration component 142 and receive the selected LSM mode from the mode selection component 144. The SRS transmission component 146 may determine the partial sounding subset 750 of SRS resources for the SRS transmission in the partial LSM mode. For example, the configuration of the persistent or semi-persistent SRS resource set may indicate SRS ports to be skipped or deactivated in the partial sounding LSM mode. The partial sounding subset may correspond to SRS ports for corner antennas of an antenna array of the receiving device 1104. In some implementations, the partial sounding subset specifies a reduced periodicity for the SRS ports that are in the SRS resource set but not in the partial sounding subset. In some implementations, the partial sounding subset specifies reduced frequency domain resources or frequency domain hops for the SRS ports that are in the SRS resource set but not in the partial sounding subset. The SRS transmission component 146 may set SRS ports that are in the SRS resource set but not in the partial sounding subset to zero power. The SRS transmission component 146 may repeat a transmission on a SRS port for the partial sounding subset on the resources of the SRS ports that are in the SRS resource set but not in the partial sounding subset.

Figure 12:
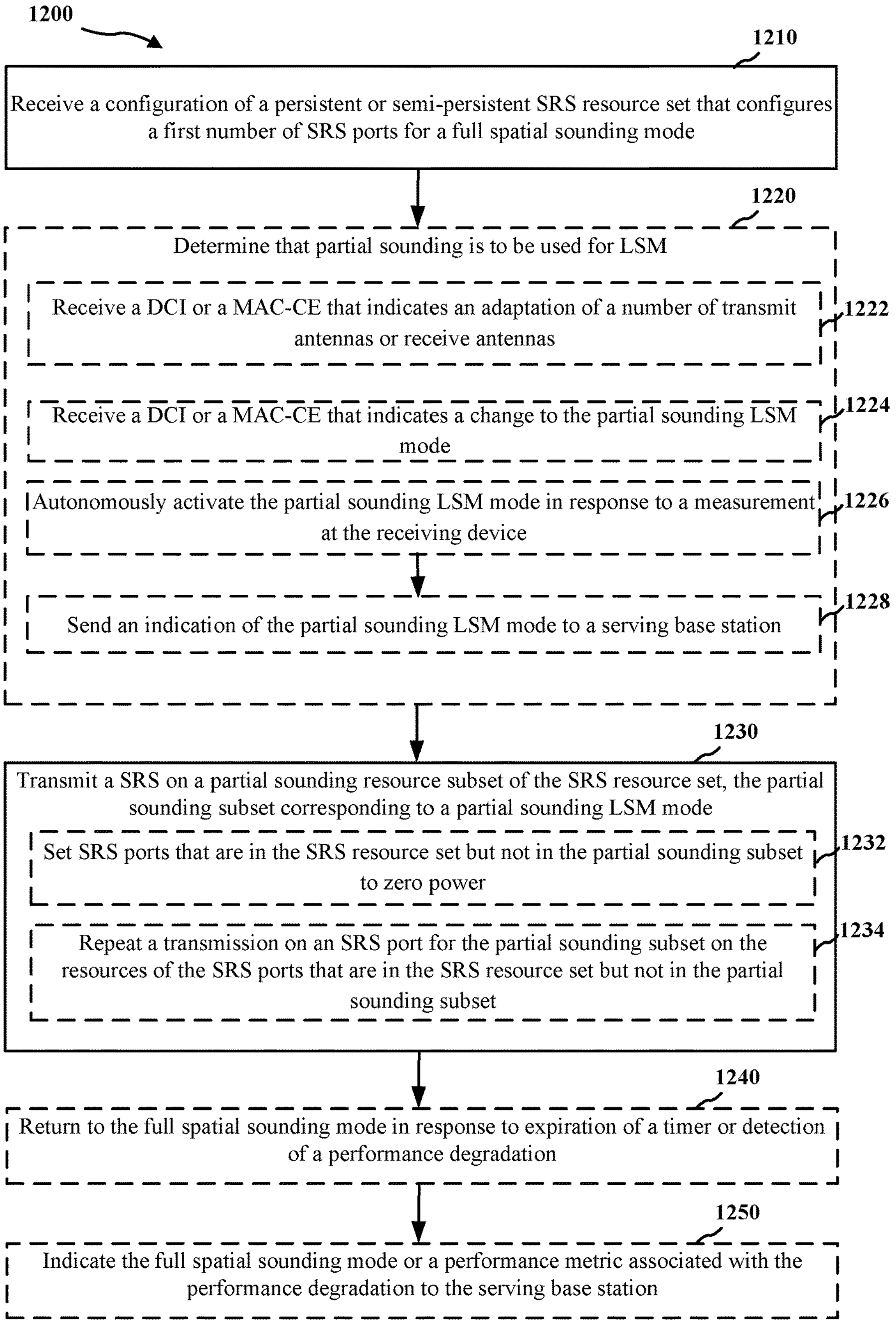
FIG. 12 is a flowchart of an example method for a UE to perform partial SRS sounding for LSM reception.

FIG. 12 is a flowchart of an example method 1200 for a receiving device (e.g., receiving device 904) to perform partial sounding for LSM. The method 1200 may be performed by a receiving device 904 (such as the UE 104 or relay device 105, which may include the memory 360 and which may be the entire UE 104 or a component of the UE 104 such as the LSM sounding component 140, TX processor 368, the RX processor 356, or the controller/processor 359). The method 1200 may be performed by the LSM sounding component 140 in communication with the LSM component 120 of the base station 102. Optional blocks are shown with dashed lines.

At block 1210, the method 1200 may include receiving a configuration of a persistent or semi-persistent SRS resource set that configures a first number of SRS ports for a full spatial sounding mode. In some implementations, for example, the UE 104, the RX processor 356 or the controller/processor 359 may execute the LSM sounding component 140 or the SRS configuration component 142 to receive the SRS configuration message 910 including a SRS configuration 710 of a persistent or semi-persistent SRS resource set 714 that configures a first number of SRS ports for a full spatial sounding mode. Accordingly, the UE 104, the RX processor 356, or the controller/processor 359 executing the LSM sounding component 140 or the SRS configuration component 142 may provide means for receiving a configuration of a persistent or semi-persistent SRS resource set that configures a first number of SRS ports for a full spatial sounding mode.

At block 1220, the method 1200 may optionally include determining that partial sounding is to be used for LSM. In some implementations, for example, the UE 104, the RX processor 356 or the controller/processor 359 may execute the LSM sounding component 140 or the mode selection component 144 to determine that partial sounding is to be used for LSM. In some implementations, at sub-block 1222, the block 1220 may optionally include receiving a DCI or a MAC-CE that indicates an adaptation of a number of transmit antennas or receive antennas. For instance the DCI or MAC-CE may indicate two transmit antennas for SRS or two receive antennas to be sounded. In some implementations, at sub-block 1224, the block 1220 may optionally include receiving a DCI or a MAC-CE that indicates a change to the partial sounding LSM mode. In some implementations, at sub-block 1226, the block 1220 may optionally include autonomously activating the partial sounding LSM mode in response to a measurement at the receiving device. For example, the measurement at the receiving device may be an estimated line of sight percentage or estimated spectral efficiency factor for the partial sounding LSM mode. In some implementations, at sub-block 1228 in response to sub-block 1226, the block 1220 may optionally include sending an indication of the partial sounding LSM mode to a serving base station. Accordingly, the UE 104, the RX processor 356, or the controller/processor 359 executing the LSM sounding component 140 or the mode selection component 144 may provide means for determining that partial sounding is to be used for LSM.

At block 1230, the method 1200 may include transmitting a SRS on a partial sounding resource subset of the SRS resource set, the partial sounding subset corresponding to a partial sounding LSM mode. In some implementations, for example, the UE 104, the RX processor 356, the TX processor 368, or the controller/processor 359 may execute the LSM sounding component 140 or the SRS transmission component 146 to transmit a SRS (e.g., partial SRS 945) on a partial sounding subset 750 of the SRS resource set 712, the partial sounding subset 750) corresponding to a partial sounding LSM mode. For example, at sub-block 1232, the block 1230 may optionally include setting SRS ports that are in the SRS resource set 712 but not in the partial sounding subset 750 to zero power. As another example, at sub-block 1234, the block 1230 may optionally include repeating a transmission on a SRS port for the partial sounding subset on the resources of the SRS ports that are in the SRS resource set but not in the partial sounding subset. Accordingly, the UE 104, the RX processor 356, the TX processor 368, or the controller/processor 359 executing the LSM sounding component 140 or the SRS transmission component 146 may provide means for transmitting a SRS on a partial sounding resource subset of the SRS resource set.

At block 1240, the method 1200 may optionally include returning to the full spatial sounding mode in response to expiration of a timer or detection of a performance degradation. In some implementations, for example, the UE 104, the RX processor 356, or the controller/processor 359 may execute the LSM sounding component 140 or the mode selection component 144 to return to the full spatial sounding mode in response to expiration of a timer or detection of a performance degradation. Accordingly, the UE 104, the RX processor 356, the TX processor 368, or the controller/processor 359 executing the LSM sounding component 140 or the mode selection component 144 may provide means for returning to the full spatial sounding mode in response to expiration of a timer or detection of a performance degradation.

At block 1250, the method 1200 may optionally include indicating the full spatial sounding mode or a performance metric associated with the performance degradation to the serving base station. In some implementations, for example, the UE 104, the TX processor 368, or the controller/processor 359 may execute the LSM sounding component 140 or the mode selection component 144 to indicate the full spatial sounding mode or a performance metric associated with the performance degradation to the serving base station. Accordingly, the UE 104, the TX processor 368, or the controller/processor 359 executing the LSM sounding component 140 or the SRS transmission component 146 may provide means for indicating the full spatial sounding mode or a performance metric associated with the performance degradation to the serving base station.

Figure 13:
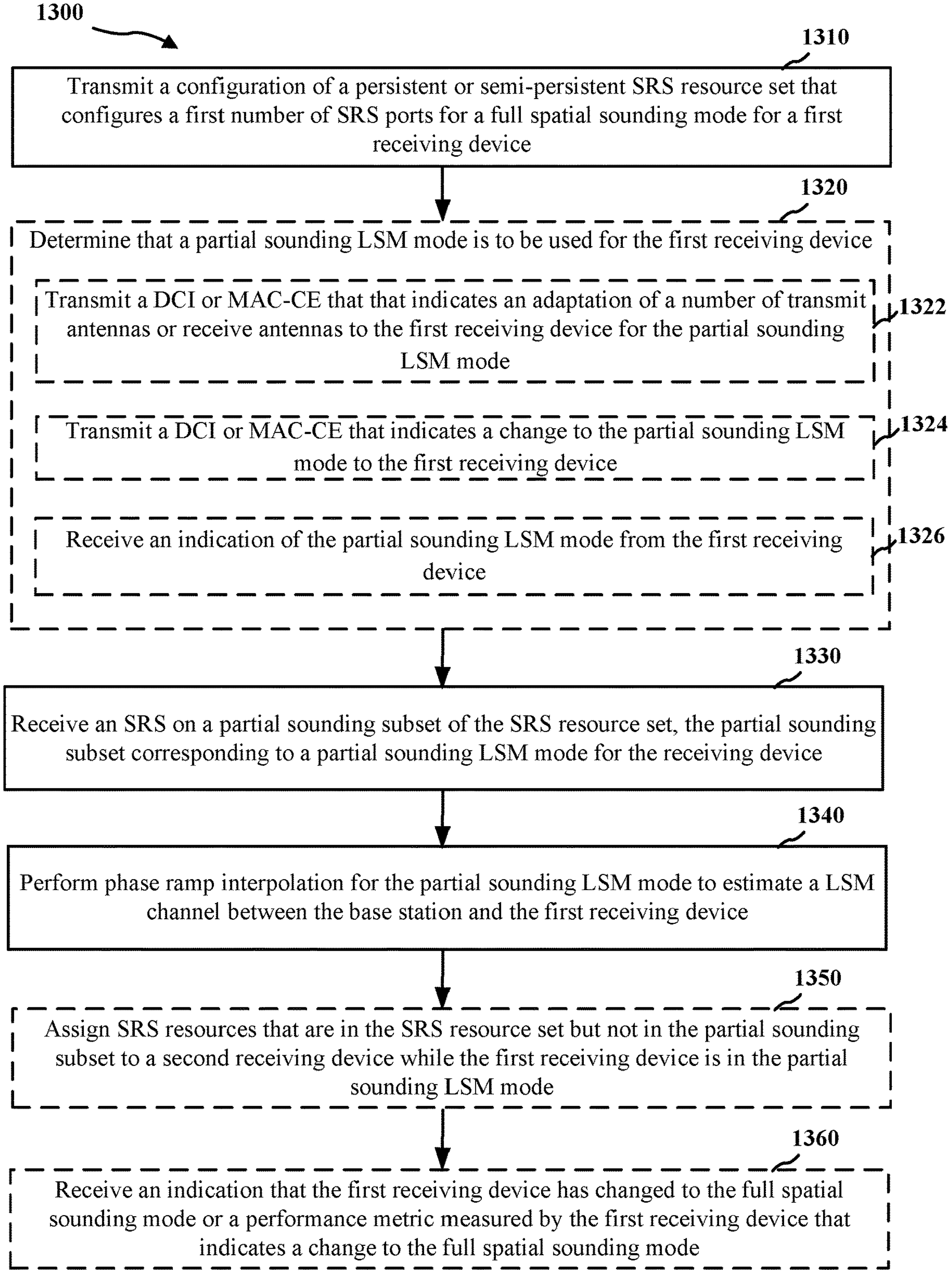
FIG. 13 is a flowchart of an example method for a BS to control SRS resources for channel estimation for LSM transmission.

FIG. 13 is a flowchart of an example method 1300 for a base station to manage SRS resources for channel estimation for LSM transmissions. The method 1300 may be performed by a base station (such as the base station 102, which may include the memory 376 and which may be the entire base station 102 or a component of the base station 102 such as the LSM component 120, the TX processor 316, the RX processor 370, or the controller/processor 375). The method 1300 may be performed by the LSM component 120 in communication with the LSM sounding component 140 of the UE 104.

At block 1310, the method 1300 may include transmitting a configuration of a persistent or semi-persistent SRS resource set that configures a first number of SRS ports for a full spatial sounding mode for a first receiving device. In some implementations, for example, the base station 102, the TX processor 316, or the controller/processor 375 may execute the LSM component 120 or the configuration component 122 to transmit a SRS configuration message 910 including a SRS configuration 710 of a persistent or semi-persistent SRS resource set 712 that configures a first number of SRS ports for a full spatial sounding mode for a first receiving device. In some implementations, the configuration of the persistent or semi-persistent SRS resource set indicates SRS ports to be skipped or deactivated in the partial sounding LSM mode. In some implementations, the configuration of the persistent or semi-persistent SRS resource set identifies a second number of SRS ports for the LSM-partial sounding mode that is less than the first number of SRS ports. In some implementations, the partial sounding subset corresponds to SRS ports for corner antennas of an antenna array of the first receiving device. In some implementations, the partial sounding subset specifies a reduced periodicity for SRS ports for the SRS ports that are in the SRS resource set but not in the partial sounding subset. In some implementations, the partial sounding subset specifies reduced frequency domain resources or frequency domain hops for the SRS ports that are in the SRS resource set but not in the partial sounding subset. Accordingly, the base station 102, the TX processor 316, or the controller/processor 375 executing the LSM component 120 or the configuration component 122 may provide means for transmitting a configuration of a persistent or semi-persistent SRS resource set that configures a first number of SRS ports for a full spatial sounding mode for a first receiving device.

At block 1320, the method 1300 may optionally include determining that a partial sounding LSM mode is to be used for the first receiving device. In some implementations, for example, base station 102, the TX processor 316, or the controller/processor 375 may execute the LSM component 120 or the mode selection component 124 to determine that a partial sounding LSM mode is to be used for the first receiving device. In some implementations, the LSM component 120 and/or the mode selection component 124 may select the LSM mode based on measurements at the base station 102 or measurements reported from the receiving device. At sub-block 1322, the block 1320 may optionally include transmitting a DCI or MAC-CE that that indicates an adaptation of a number of transmit antennas or receive antennas to the first receiving device for the partial sounding LSM mode. At block 1324, the block 1320 may optionally include transmitting a DCI or MAC-CE that indicates a change to the partial sounding LSM mode to the first receiving device. In some implementations, the receiving device may autonomously select an LSM mode. At block 1326, the block 1320 may optionally include receiving an indication of the partial sounding LSM mode from the first receiving device. Accordingly, the base station 102, the TX processor 316, or the controller/processor 375 executing the LSM component 120 or the mode selection component 124 may provide means for determining that a partial sounding LSM mode is to be used for the first receiving device.

At block 1330, the method 1300 may include receiving a SRS on a partial sounding subset of the SRS resource set, the partial sounding subset corresponding to a partial sounding LSM mode for the receiving device. In some implementations, for example, the base station 102, the RX processor 370, or the controller/processor 375 may execute the LSM component 120 or the SRS receiving component 126 to receive a SRS (e.g., partial SRS 945) on a partial sounding subset 750 of the SRS resource set 712, the partial sounding subset 750) corresponding to a partial sounding LSM mode for the receiving device. Accordingly, the base station 102, the RX processor 370, or the controller/processor 375 executing the LSM component 120 or the SRS receiving component 126 may provide means for receiving a SRS on a partial sounding subset of the SRS resource set, the partial sounding subset corresponding to a partial sounding LSM mode for the receiving device.

At block 1340, the method 1300 may include performing phase ramp interpolation for the partial sounding LSM mode to estimate a LSM channel between the base station and the first receiving device. In some implementations, for example, base station 102, the TX processor 316, or the controller/processor 375 may execute the LSM component 120 or the channel estimation component 128 to perform phase ramp interpolation for the partial sounding LSM mode to estimate a LSM channel between the base station and the first receiving device. Accordingly, the base station 102, the TX processor 316, or the controller/processor 375 executing the LSM component 120 or the channel estimation component 128 may provide means for performing phase ramp interpolation for the partial sounding LSM mode to estimate a LSM channel between the base station and the first receiving device.

At block 1350, the method 1300 may optionally include assigning SRS resources that are in the SRS resource set but not in the partial sounding subset to a second receiving device while the first receiving device is in the partial sounding LSM mode. In some implementations, for example, base station 102, the TX processor 316, or the controller/processor 375 may execute the LSM component 120 or the configuration component 122 to assign SRS resources that are in the SRS resource set but not in the partial sounding subset to a second receiving device 906 while the first receiving device 904 is in the partial sounding LSM mode. Accordingly, the base station 102, the TX processor 316, or the controller/processor 375 executing the LSM component 120 or the channel configuration component 122 may provide means for assigning SRS resources that are in the SRS resource set but not in the partial sounding subset to a second receiving device while the first receiving device is in the partial sounding LSM mode.

At block 1360, the method 1300 may optionally include receiving an indication that the first receiving device has changed to the full spatial sounding mode or a performance metric measured by the first receiving device that indicates a change to the full spatial sounding mode. In some implementations, for example, base station 102, the TX processor 316, or the controller/processor 375 may execute the LSM component 120 or the mode selection component 124 to receive an indication that the first receiving device has changed to the full spatial sounding mode or a performance metric measured by the first receiving device that indicates a change to the full spatial sounding mode. Accordingly, the base station 102, the TX processor 316, or the controller/processor 375 executing the LSM component 120 or the mode selection component 124 may provide means for receiving an indication that the first receiving device has changed to the full spatial sounding mode or a performance metric measured by the first receiving device that indicates a change to the full spatial sounding mode.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms “upper” and “lower” are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at a receiving device, comprising:

receiving a configuration of a persistent or semi-persistent sounding reference signal (SRS) resource set that configures a first number of SRS ports for a full spatial sounding mode;

transmitting a SRS on a partial sounding resource subset of the SRS resource set, the partial sounding resource subset corresponding to a partial sounding line of sight multiple-input-multiple-output (LSM) mode;

autonomously activating the partial sounding LSM mode in response to a measurement at the receiving device, wherein the measurement at the receiving device is an estimated line of sight percentage or an estimated spectral efficiency factor for the partial sounding LSM mode; and sending an indication of the partial sounding LSM mode to a serving base station.

2. The method of claim 1, further comprising determining that partial sounding is to be used in response to receiving a downlink control information (DCI) or a media access control (MAC) control element (CE) that indicates an adaptation of a number of transmit antennas or receive antennas.

3. The method of claim 1, further comprising determining that partial sounding is to be used in response to receiving a DCI or a MAC-CE that indicates a change to the partial sounding LSM mode.

4. The method of claim 1, wherein the configuration of the persistent or semi-persistent SRS resource set indicates SRS ports to be skipped or deactivated in the partial sounding LSM mode.

5. The method of claim 1, further comprising returning to the full spatial sounding mode in response to expiration of a timer or detection of a performance degradation.

6. The method of claim 5, further comprising indicating the full spatial sounding mode or a performance metric associated with the performance degradation to the serving base station.

7. The method of claim 6, wherein the indication is a request to fall back to the full spatial sounding mode.

8. The method of claim 1, wherein the partial sounding resource subset corresponds to SRS ports for corner antennas of an antenna array of the receiving device.

9. The method of claim 1, wherein transmitting the SRS on the partial sounding resource subset comprises setting SRS ports that are in the SRS resource set but not in the partial sounding resource subset to zero power.

10. The method of claim 1, wherein transmitting the SRS on the partial sounding resource subset comprises repeating a transmission on a SRS port for the partial sounding resource subset on the resources of the SRS ports that are in the SRS resource set but not in the partial sounding resource subset.

11. The method of claim 1, wherein the partial sounding resource subset specifies a reduced periodicity for the SRS ports that are in the SRS resource set but not in the partial sounding resource subset.

12. The method of claim 1, wherein the partial sounding resource subset specifies reduced frequency domain resources or frequency domain hops for the SRS ports that are in the SRS resource set but not in the partial sounding resource subset.

13. A method of wireless communication, comprising, at a base station:

transmitting a configuration of a persistent or semi-persistent sounding reference signal (SRS) resource set that configures a first number of SRS ports for a full spatial sounding mode for a first receiving device;

receiving a SRS on a partial sounding resource subset of the SRS resource set, the partial sounding resource subset corresponding to a partial sounding line of sight multiple-input-multiple-output (LSM) mode for the receiving device;

performing phase ramp interpolation for the partial sounding LSM mode to estimate a LSM channel between the base station and the first receiving device;

receiving an indication of the partial sounding LSM mode from the first receiving device; and receiving an indication that the first receiving device has changed to the full spatial sounding mode or a performance metric measured by the first receiving device that indicates a change to the full spatial sounding mode.

14. The method of claim 13, further comprising transmitting a downlink control information (DCI) or media access control (MAC) control element (CE) that indicates an adaptation of a number of transmit antennas or receive antennas to the first receiving device for the partial sounding LSM mode.

15. The method of claim 13, further comprising transmitting a DCI or MAC-CE that indicates a change to the partial sounding LSM mode to the first receiving device.

16. The method of claim 13, wherein the configuration of the persistent or semi-persistent SRS resource set indicates SRS ports to be skipped or deactivated in the partial sounding LSM mode.

17. The method of claim 13, wherein the configuration of the persistent or semi-persistent SRS resource set identifies a second number of SRS ports for the LSM-partial sounding mode that is less than the first number of SRS ports.

18. The method of claim 13, wherein the partial sounding resource subset corresponds to SRS ports for corner antennas of an antenna array of the first receiving device.

19. The method of claim 13, wherein the partial sounding resource subset specifies a reduced periodicity for SRS ports for the SRS ports that are in the SRS resource set but not in the partial sounding resource subset.

20. The method of claim 13, wherein the partial sounding resource subset specifies reduced frequency domain resources or frequency domain hops for the SRS ports that are in the SRS resource set but not in the partial sounding resource subset.

21. The method of claim 13, further comprising assigning SRS resources that are in the SRS resource set but not in the partial sounding resource subset to a second receiving device while the first receiving device is in the partial sounding LSM mode.

22. An apparatus for wireless communication at a receiving device, comprising:

a memory storing computer-executable instructions; and at least one processor configured to execute the instructions to:

receive a configuration of a persistent or semi-persistent sounding reference signal (SRS) resource set that configures a first number of SRS ports for a full spatial sounding mode;

transmit a SRS on a partial sounding resource subset of the SRS resource set, the partial sounding resource subset corresponding to a partial sounding line of sight multiple-input-multiple-output (LSM) mode;

autonomously activate the partial sounding LSM mode in response to a measurement at the receiving device, wherein the measurement at the receiving device is an estimated line of sight percentage or an estimated spectral efficiency factor for the partial sounding LSM mode; and send an indication of the partial sounding LSM mode to a serving base station.

23. The apparatus of claim 22, wherein the at least one processor is configured to determine that partial sounding is to be used in response to receiving a DCI or a MAC-CE that indicates a change to the partial sounding LSM mode.

24. An apparatus for wireless communication at a base station, comprising:

a memory storing computer-executable instructions; and at least one processor configured to execute the instructions to:

transmit a configuration of a persistent or semi-persistent sounding reference signal (SRS) resource set that configures a first number of SRS ports for a full spatial sounding mode for a first receiving device;

receive a SRS on a partial sounding resource subset of the SRS resource set, the partial sounding resource subset corresponding to a partial sounding line of sight multiple-input-multiple-output (LSM) mode for the receiving device; and perform phase ramp interpolation for the partial sounding LSM mode to estimate a LSM channel between the base station and the first receiving device;

receive an indication of the partial sounding LSM mode from the first receiving device; and receive an indication that the first receiving device has changed to the full spatial sounding mode or a performance metric measured by the first receiving device that indicates a change to the full spatial sounding mode.

25. The apparatus of claim 24, wherein the at least one processor is configured to assign SRS resources that are in the SRS resource set but not in the partial sounding resource subset to a second receiving device while the first receiving device is in the partial sounding LSM mode.

26. The apparatus of claim 22, wherein the at least one processor is configured to return to the full spatial sounding mode in response to expiration of a timer or detection of a performance degradation.

27. The apparatus of claim 26, wherein the at least one processor is configured to indicate the full spatial sounding mode or a performance metric associated with the performance degradation to the serving base station.

28. The apparatus of claim 27, wherein the indication is a request to fall back to the full spatial sounding mode.

29. The apparatus of claim 24, wherein the configuration of the persistent or semi-persistent SRS resource set identifies a second number of SRS ports for the LSM-partial sounding mode that is less than the first number of SRS ports.

30. The apparatus of claim 24, wherein the partial sounding resource subset corresponds to SRS ports for corner antennas of an antenna array of the first receiving device.

* * * * *